Dec. 28, 1965  F. L. CORDES  3,225,613
COUPLING MECHANISM
Filed May 25, 1964
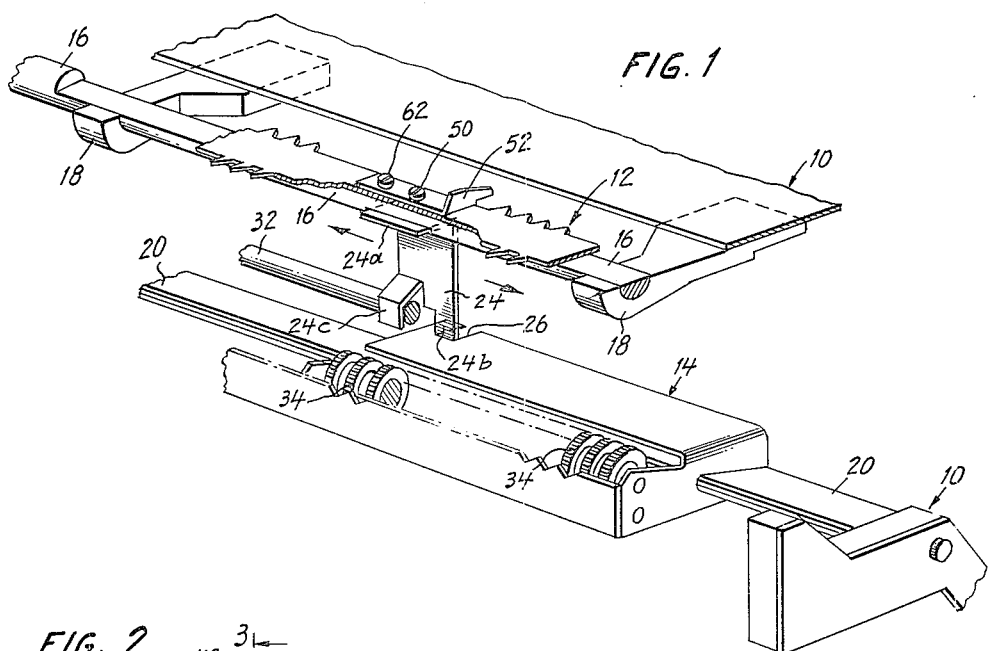
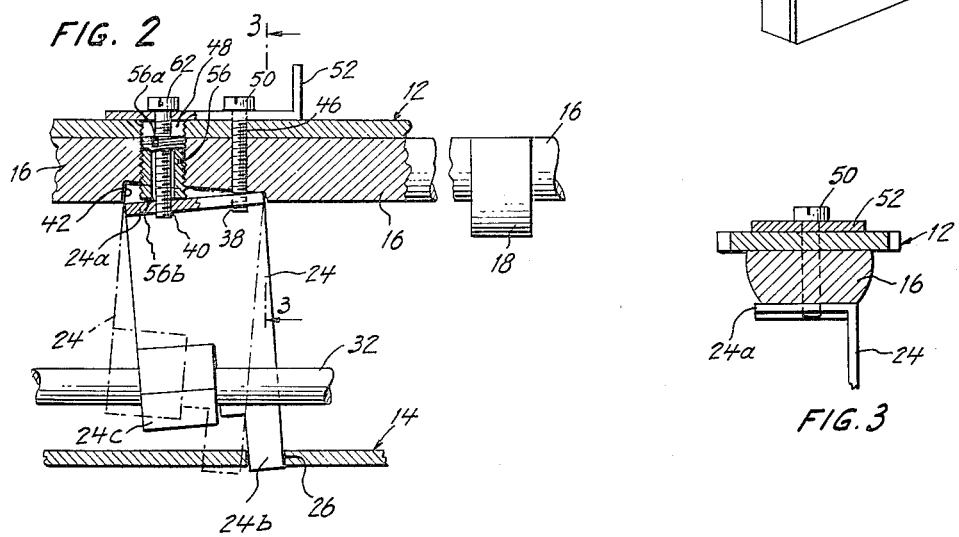
INVENTOR.
FLOYD L. CORDES
BY A.J. DeAngelis
ATTORNEY

United States Patent Office 3,225,613
Patented Dec. 28, 1965

3,225,613
COUPLING MECHANISM
Floyd L. Cordes, Norwalk, Conn., assignor to Sperry Rand Corporation, New York, N.Y., a corporation of Delaware
Filed May 25, 1964, Ser. No. 369,964
7 Claims. (Cl. 74—110)

The invention relates to mechanism for coupling a driving unit to a driven unit to transmit linear motion of the driving unit to the driven unit.

The invention involves the provision of coupling mechanism constructed so as to permit easy adjustment of the positions of the driven unit and the driving unit with respect to each other; their relative positions being adjustable bi-directionally along their parallel linear paths of travel.

In carrying out the invention, according to a preferred embodiment, a driving unit is mounted for linear reciprocating motion along a predetermined path of travel. A driven unit is similarly mounted; its path of travel extending parallel to the path of the driving unit but spaced therefrom. A rigid longitudinal connecting member, attached at one of its ends to one of the aforementioned units and extending at its other end into a receiving aperture defined in the other of the units, couples the two units one to the other for simultaneous coupled bi-directional translation along their respective linear paths of travel. Means are provided to vary accurately the angle at which the longitudinal axis of the rigid connecting member intersects the respective parallel linear paths of travel of the two coupled units. Variation of such angle enables the shifting of either unit with respect to the other in either direction along their respective paths of travel to accurately position the units.

It is, therefore, an object of the invention to provide an improved mechanism for coupling reciprocating driving and driven units, which coupling permits easy and accurate adjustment of the positions of the units relative to each other.

Features and advantages of the invention will be seen from the above, from the following description of the operation of the preferred embodiment when considered in conjunction with the drawing and from the appended claims.

For purposes of illustration the invention will be described with relation to the coupling of two linearly actuated mechanisms of a mechanical calculator; namely, the escapement rack (the driving unit) and the list unit (the driven unit); it being understood, nevertheless, that the invention is not so limited and without departing from the spirit and scope thereof is applicable to the coupling of similar linearly actuated units.

In the drawings:

FIG. 1 is a simplified schematic perspective, fragmentary illustration of a portion of the escapement mechanism and list unit mechanism of a calculator, embodying the invention;

FIG. 2 is a cross-sectional view slightly enlarged taken looking from the front on part of an elevational plane including the connecting member 24 of FIG. 1; and FIG. 3 is a cross-sectional view taken along the line 3—3 of FIG. 2.

Referring to FIG. 1, 10 generally designates framework of a mechanical calculator, while 12 and 14 generally designate its escapement rack and list unit, respectively. Escapement rack 12 is carried by a horizontally disposed, longitudinally extending bar 16 which is slidably mounted on horizontally extending supports 18 for bi-directional longitudinal movement. List unit 14 is likewise mounted for bi-directional linear movement; being slidably mounted on a track 20 which is spaced below bar 16 and extends parallel to the longitudinal axis of the bar.

Rack 12 is coupled to list unit 14 by a connecting member or finger 24, extending between the two spaced units. Member 24 is provided at its upper end with a horizontally extending attaching flange 24a for attachment to escapement rack 12. Connecting member 24 depends from escapement rack 12 and terminates in a tang portion 24b which is fitted into and protrudes through an aperture 26 defined in list unit 14. Connecting member 24 is also provided with a bent-out portion 24c formed to slidably engage a horizontally extending guide bar 32 disposed intermediate rack 12 and list unit 14.

For purposes of simplicity and because they form no part of the invention, the actuating mechanism for driving escapement rack 12 has been omitted; it being understood that the escapement rack is driven to the right (FIG. 1) during what is termed a "restore" stroke by powered mechanism (not shown) and "escapes" or is driven to the left in step-by-step fashion under the influence of a biasing spring (also not shown); the bi-directional movement being indicated by directional arrows.

In the usual fashion, as each successive digit is introduced into the calculator, escapement rack 12 is stepped to the left one increment, carrying the coupled list unit 14 with it. This places successive input storage wheels 34, carried by the list unit, into alignment with respective associated transfer racks (not shown). Such alignment must be precise for proper operation of the calculator and sometimes requires the accurate shifting of list unit 14 to either the right or left along its path of travel with respect to escapement rack 12 to which it is coupled. In the subject coupling mechanism, connecting member 24 is attached to rack 12 adjustably to provide a simple means to effect such accurate shifting.

This is illustrated in FIGS. 2 and 3. Attaching flange 24a of connecting member 24 is provided with two threaded apertures 38 and 40 which are spaced apart with respect to each other along the path of travel of rack 12. A notch 42 is cut into the underside of bar 16 for receiving flange 24a. The notch is cut along the longitudinal axis of bar 16 at a slight upwardly extending angle from the horizontal to permit placement of the left end of attaching flange 24a above its right end, if desired, as is indicated by the position of member 24 shown in broken line outline.

Two stud receiving apertures 46 and 48 extend through rack 12 and bar 16 into notch 42. Apertures 46, 48 are spaced for respective coaxial alignment with threaded apertures 38, 40 when attaching flange 24a is placed into notch 42.

A threaded bolt 50 extends through a hole defined in a locking plate 52, passes loosely through aperture 46 and is threaded into aperture 38 of attaching flange 24a, fastening the right hand portion of the flange to rack 12. Aperture 48 is tapped to receive a threaded sleeve 56 which is provided at its top face with a screw driver receiving slot 56a. Threaded sleeve 56 may be threaded into aperture 48 so as to place its bottom face 56b into notch 42, as may be desired. A threaded bolt 62 extends through an aligned aperture defined in locking plate 52, passes loosely through the interior channel of threaded sleeve 56 and is threaded into aperture 40 of attaching flange 24a to fasten the left hand portion of the flange to rack 12, completing the attachment of connecting member 24 to the rack.

This arrangement permits the adjustment of the position of list unit 14 with respect to escapement rack 12 in either direction along the paths of travel of such units. For example, assume that it is desired to shift accurately list unit 14 to the right with respect to rack 10 a certain amount. To accomplish this, bolt 50 is loosened, bolt 62 is removed and locking plate 52 is pivoted out of the way to permit the insertion of a screw driver into slot 58 of threaded sleeve 56. Sleeve 56 is threaded downward in aperture 48 until its bottom face 56b protrudes into notch 42 and engages the upper surface of attaching flange 24a near its left side edge. As sleeve 56 is threaded further downward, it forces the left hand side of flange 24a downward with respect to its right side, tilting connecting member 24 as shown in solid block outline in FIG. 2. To permit such tilting, bolt 50 must flex, and is so seelcted. As connecting member 24 is tilted, its tang portion 24b moves to the right urging list unit 14 to the right with respect to escapement rack 12. When the desired relative positions of the rack and list unit is obtained locking plate 52 is pivoted back into place. Bolt 62 is then again extended through plate 52, and extending through sleeve 56 it is threaded into aperture 40 of attaching flange 24a and tightened. Tightening of bolt 62 locks the left portion of attaching flange 24a firmly against bottom face 56b of sleeve 56. Bolt 50 is then tightened locking connecting member 24 in the desired tilted position to maintain the adjusted relative positions of rack 12 and list unit 14 during their reciprocating movements.

Next assume that it is desired to shift list unit 14 accurately to a position more to the left with respect to escapement rack 12. Under such conditions, the above procedure is repeated with the exception that threaded sleeve 48 instead of being threaded downward is "backed off" so as to place its lowermost face 56b at a desired point above the horizontal plane. When bolt 62 is threaded into aperture 40 of attaching flange 24a and tightened, the left hand portion of the flange is pulled upward into notch 42. As bolt 62 is tightened further, bolt 50 flexes, permitting the left portion of flange 24a to be pulled by bolt 62 above the horizontal plane, until stopped by bottom face 56b of sleeve 56. This action tilts connecting member 24 to the position indicated in broken line outline, moving list unit 14 to the left to the desired position relative to escapement rack 12.

As changes can be made in the above described construction and many apparently different embodiments of the invention can be made without departing from the scope thereof, it is intended that all matter contained in the above description or shown on the accompanying drawings be interpreted as illustrative only and not in a limiting sense.

What is claimed is:

1. Mechanism for adjustably coupling a driving unit mounted for reciprocatory translation along a predetermined linear path to a driven unit similarly mounted for translation along a path parallel to and spaced from said predetermined path, said mechanism comprising; a rigid longitudinally extending connecting member having two spaced apart end portions, said member having one of said end portions attached to one of said units and the other of said end portions in engagement with the other of said units for transmitting motion therebetween, said longitudinal rigid connecting member being attached and in engagement with said units at predetermined respective points of attachment and engagement on said units, said connecting member extending between said units at a certain angle with respect to said parallel spaced paths; and means for adjusting such angle while maintaining said respective points of attachment and engagement of said member with said units, said adjustment being effective to accurately position said units with respect to each other along their respective paths of travel.

2. Mechanism as set forth in claim 1 wherein said means for adjusting said angle include means for flexibly attaching said connecting member to said one unit and means for flexing said flexible attaching means for adjusting said angle in either direction of said predetermined path of travel.

3. Mechanism as set forth in claim 2 wherein said adjusting means also includes means for locking said flexible attaching means at desired angles.

4. Mechanism as set forth in claim 1 wherein said one end portion of said connecting member is in the form of a laterally extending attaching flange, said attaching flange having defined therein two threaded bolt receiving apertures spaced apart predetermined distances along said path of travel; and wherein a threaded bolt is threaded through said one unit into a first one of said threaded apertures of said attaching flange, said bolt being constructed so that it can be slightly flexed; and wherein said one unit is notched to receive said attaching flange, said notch being configurated to permit said attaching flange to be positioned in a tilted position with respect to said path of travel; and wherein in said angle adjusting means there is provided means for selectively placing and maintaining said flange into predetermined tilted positions.

5. Mechanism as set forth in claim 4 wherein said means for selectively placing and maintaining include an adjustable stop in the form of a threaded sleeve threaded through said one unit and adjustably protruding into said notch for engaging said attaching flange at said predetermined distance from said first threaded aperture, and further includes locking means in the form of a threaded stud extending through said sleeve and threaded into the second of said threaded apertures for locking said attaching flange against said adjustable stop.

6. Mechanism as set forth in claim 1 wherein said other end portion of said connecting member is in the form of a tang, and wherein said other of said units has a tang receiving aperture defined therein for removably receiving said tang.

7. Mechanism for adjustably coupling a driving unit mounted for reciprocatory translation along a predetermined linear path to a driven unit similarly mounted for translation along a path parallel to and spaced from said predetermined path, said mechanism comprising; a rigid longitudinally extending connecting member having two spaced apart end portions, said member having one of said end portions dimensioned to extend laterally a certain distance along said path of travel for attachment to one of said units and the other of said end portions extending into engagement with the other of said units for transmitting motion therebetween; attaching means for fastening said one end portion at a point to said one unit while permitting movement of the remainder of said laterally extending one end portion away from and toward said other unit relative to said point of said fastening, said longitudinal rigid connecting member being attached and in engagement with said units at predetermined respective points of attachment and engagement on said units, said connecting member extending between said units at a certain angle with respect to said parallel spaced paths; and means for adjusting such angle while maintaining said respective points of attachment and engagement of said member with said units, said adjustment being effective to accurately position said units with respect to each other along their respective paths of travel.

References Cited by the Applicant

UNITED STATES PATENTS 1,118,915   12/1914   Broluska _____ 287—58
1,693,532   11/1928   Stewart _____ 287—58 X BROUGHTON G. DURHAM, *Primary Examiner.*
D. H. THIEL, *Assistant Examiner.*